(12) United States Patent
Beabes et al.

(10) Patent No.: US 8,073,728 B2
(45) Date of Patent: Dec. 6, 2011

(54) MULTI-COLOR BILLING PROCESS

(75) Inventors: Minette A. Beabes, Rochester, NY (US);
John R. Quitter, Webster, NY (US);
Michael E. Farrell, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 683 days.

(21) Appl. No.: 11/687,035

(22) Filed: Mar. 16, 2007

(65) Prior Publication Data
US 2008/0228667 A1 Sep. 18, 2008

(51) Int. Cl.
*G06Q 10/00* (2006.01)
*G06Q 30/00* (2006.01)
(52) U.S. Cl. ........................................... 705/7.35
(58) Field of Classification Search ............. 705/1, 7.35
See application file for complete search history.

(56) References Cited

U.S. PATENT DOCUMENTS

| | | | |
|---|---|---|---|
| 5,884,120 A * | 3/1999 | Ito et al. | 399/54 |
| 6,516,157 B1 * | 2/2003 | Maruta et al. | 399/8 |
| 2005/0134886 A1 | 6/2005 | Farrell et al. | |
| 2005/0185222 A1 | 8/2005 | Sammis et al. | |
| 2006/0077468 A1 | 4/2006 | Loce et al. | |

OTHER PUBLICATIONS

Ferris, Fred. "Quick Printing: Cut to the Quick" American Printer v209n4. pp. 34-37. Jul. 1992.*

* cited by examiner

*Primary Examiner* — John Hayes
*Assistant Examiner* — Allen J Jung
(74) *Attorney, Agent, or Firm* — Gibb I.P. Law Firm, LLC

(57) ABSTRACT

Embodiments herein include a method that begins by receiving a print job for a customer from an intermediary program such as a print driver. The print job comprises instructions to print a document for the customer and includes, for example, data and print characteristics. The method then evaluates the colorspace of each page of the print job to determine whether any multi-color items are included within the print job. The method ignores classifications of the print job as either a multi-color print job (e.g., color print job) or a single color print job (e.g., black and white) from the print driver and, instead, classifies the print job as either a multi-color print job or a single color print job based only on whether the multi-color items are included within the print job. Then, the method provides the billing information for the customer to an appropriate entity that bills the customer.

17 Claims, 2 Drawing Sheets

MULTI-COLOR BILLING PROCESS

BACKGROUND

Embodiments herein generally relate to systems that bill for printing documents and more particularly to a method that bases the multi-color/single-color billing distinction on the colorspace of the documents being printed and ignores any multi-color indications received from the print drivers.

In certain instances, customers of printing services are incorrectly billed for color printing charges when they choose black and white or grayscale printing. For example, in some existing multi-function devices, if a user scans a document to file or to e-mail, and if the user specifically chooses grayscale as the desired portable document format (PDF) option, the file is captured in PDF with the colorspace calibrated gray (CalGray). This allows for device independence, allowing (in theory) any printer to get and render the same output. Similarly, choosing "Black" from the standard Adobe print driver interface can cause the color space attribute CalGray (Adobe print drivers are available from Adobe Systems Incorporated, San Jose, Calif., USA).

However, in spite of the fact that CalGray is intended to represent image data exclusively as 256 gray levels, with no chromatic data, and no accompanying ICC profile, many printers recognize CalGray documents as color. This would lead to, among other things, customers being charged for color prints, even for strictly monochrome images. The interpretation of CalGray documents as color can be seen by using Adobe Acrobat Pro 7.0 preflight tools, which generates the message "Document generates more than one plate", where plate refers to an offset press plate, one for each process color. While one specific print driver is mentioned above, the embodiments discussed below, which address these issues, apply to all similar printer intermediaries and print drivers.

SUMMARY

The embodiments herein provide a method, a computer program, a service, etc. for billing customers for print jobs. More specifically, the method begins by receiving a print job for a customer from an intermediary program such as a print driver.

The print job comprises instructions to print a document for the customer and includes, for example, data and print characteristics. The method then evaluates the colorspace of each page of the print job to determine whether any multi-color items are included within the print job.

The method ignores classifications of the print job as either a multi-color print job (e.g., color print job) or a single color print job (e.g., black and white) from the print driver and, instead, classifies the print job as either a multi-color print job or a single color print job based only on whether multi-color items are included within the print job. Then, the method provides the billing information for the customer to an appropriate entity that bills the customer.

This billing information makes a distinction for a multi-color print job and a single color print job by charging different amounts between the multi-color print job and the single color print job. For example, it is common for customers to be charged more for color printing when compared to black and white printing. The method can classify a grayscale printing as a single color job, while many conventional systems incorrectly bill grayscale print jobs as color jobs.

Another embodiment comprises a system that includes a central processing unit (within a computer) and graphic user interface adapted to receive the instructions that relate to the print job. The system can also include a scanner operatively connected to the graphic user interface through the computer and central processing unit to receive items to be printed or copied. The scanner is adapted to scan a previously printed document to produce rasterized data. A memory is provided in the system operatively connected to the scanner to store the print job, the single/multi-color classification, the billing information, and any other necessary data.

The central processing unit is operatively connected to the memory and is adapted to execute a printing program such as a print driver to print the document. A printer is included operatively connected to the central processing unit and computer and is adapted to print the document. The embodiments herein can be used with any conventional device that has the ability to print in multiple colors.

Thus, the embodiments herein provide a method of selecting the printer color mode based upon the colorspace of the PDL content. With embodiments herein, the printer evaluates the content of each page to be printed. Pages which exclusively contain objects defined in single color colorspaces will be printed and billed in a single color print mode. The default value for single color print mode is black, but users may specify single colors other than black; typically these are process colors such as cyan, magenta, or yellow. Jobs printed in the single color mode using black toner are counted as a black only print.

The determination of black only pages by evaluating color spaces and color values utilized on the page by embodiments herein is faster and uses less computing resources than a post-raster image processing evaluation of the pixels generated for the page. These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

As mentioned above, in certain instances, customers of printing services are incorrectly billed for color printing charges when they choose black and white or grayscale printing because of problems with intervening programs, such as print drivers and the printers that receive instructions from the print drivers. The embodiments herein provide processes, systems, services, computer programs, etc. that bill for printing documents. The embodiments herein base the multi-color/single-color billing distinction on the colorspace of the documents being printed and ignore any multi-color indications received from the print drivers.

The embodiments herein provide a method of selecting the printer color mode based upon the colorspace of the PDL content. With embodiments herein, the printer evaluates the content of each page to be printed. Pages which exclusively contain objects defined in CalibratedGrey or DeviceGrey colorspaces will be printed and billed in a single color print mode. The default value for single color print mode is black, but users may specify colors other than black; typically these are process colors such as cyan, magenta, or yellow. Jobs printed in the single color mode using black toner are counted as a black only print.

More specifically, for each page presented for printing, the embodiments herein evaluate the colorspace of each object on the page. To minimize color mode switching which can result in inefficient use of printer resources, printer products may choose to evaluate multiple pages in a job and select a common mode for multiple pages. If all objects on a page are defined using DeviceGray or CalibratedGray colorspaces AND the object colors are all black or unspecified, the embodiments herein select the default single color print mode and print the page.

With the embodiments herein, pages printed using the black single color print mode would be billed as monochrome or black-only prints. Similarly, if the object colors were consistently any value other than black (cyan, magenta, yellow, etc.), the embodiments herein use the specified single color print modes. Selection of a single color print mode in embodiments herein does not preclude color transformations which use color management information in the object, such as gamma, white point and black point values. The determination of black only pages by evaluating color spaces and color values utilized on the page by embodiments herein is faster and uses less computing resources than a post-raster image processing evaluation of the pixels generated for the page.

Figure 1:
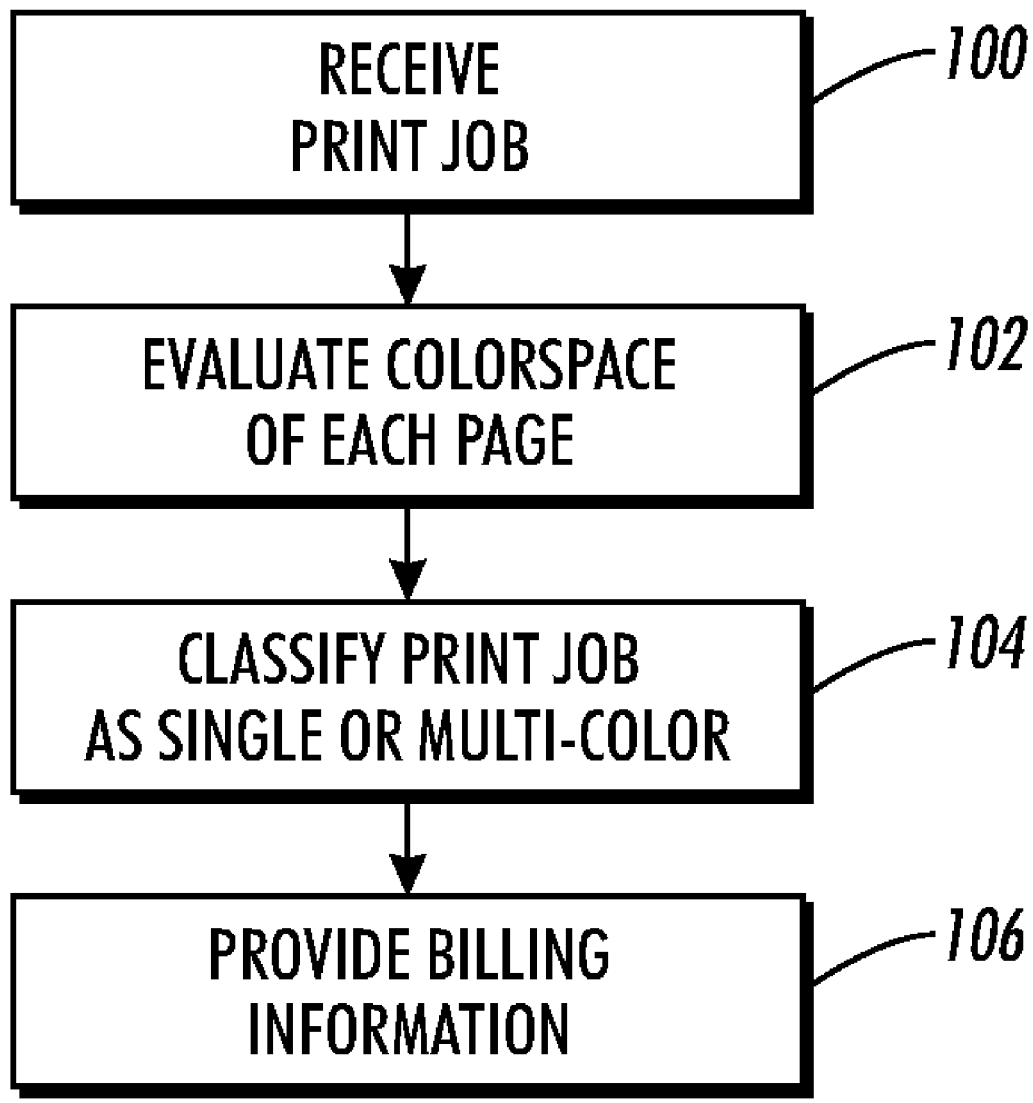
FIG. 1 is a flow diagram illustrating an embodiment herein.

As shown in FIG. 1, the embodiments herein provide methods, a computer program, a service, etc., for billing customers for print jobs. More specifically, the method begins in item 100 by receiving a print job for a customer from an intermediary program such as a print driver. The print job comprises instructions to print a document for the customer and includes, for example, data and print characteristics.

The method then evaluates the colorspace of each page of the print job in item 102 to determine whether any multi-color items are included within the pages. Many different methods can be used to evaluate colorspaces, such as red, green, blue (RGB) and cyan, magenta, yellow, black (CMYK) colorspaces. For example, U.S. Patent Publications 2005/0134886 and 2006/0077468 (the complete disclosures of which are incorporated herein by reference) describe process where the colorspaces of items to be printed are examined to determine their color content.

The method ignores classifications of the print job (or each page in the print job) as either a multi-color print job or page (e.g., color print job or page) or a single color print job or page (e.g., black and white) from the print driver and, instead, classifies the print job (or page) as either a multi-color print job (or page) or a single color print job (or page) based only on whether multi-color items are included within the color space of the print job (or page) in item 104.

Then, the method provides the billing information for the customer to an appropriate entity that bills the customer in item 106. This billing information makes a distinction between the multi-color print job (or page) and the single color print job (or page) by charging different amounts between the multi-color print job (or page) and the single color print job (or page). For example, it is common for customers to be charged more for color printing when compared to black and white printing. The method can classify a grayscale printing as a single color job or page, while many conventional systems incorrectly bill grayscale print job or pages as color job or pages.

Figure 2:
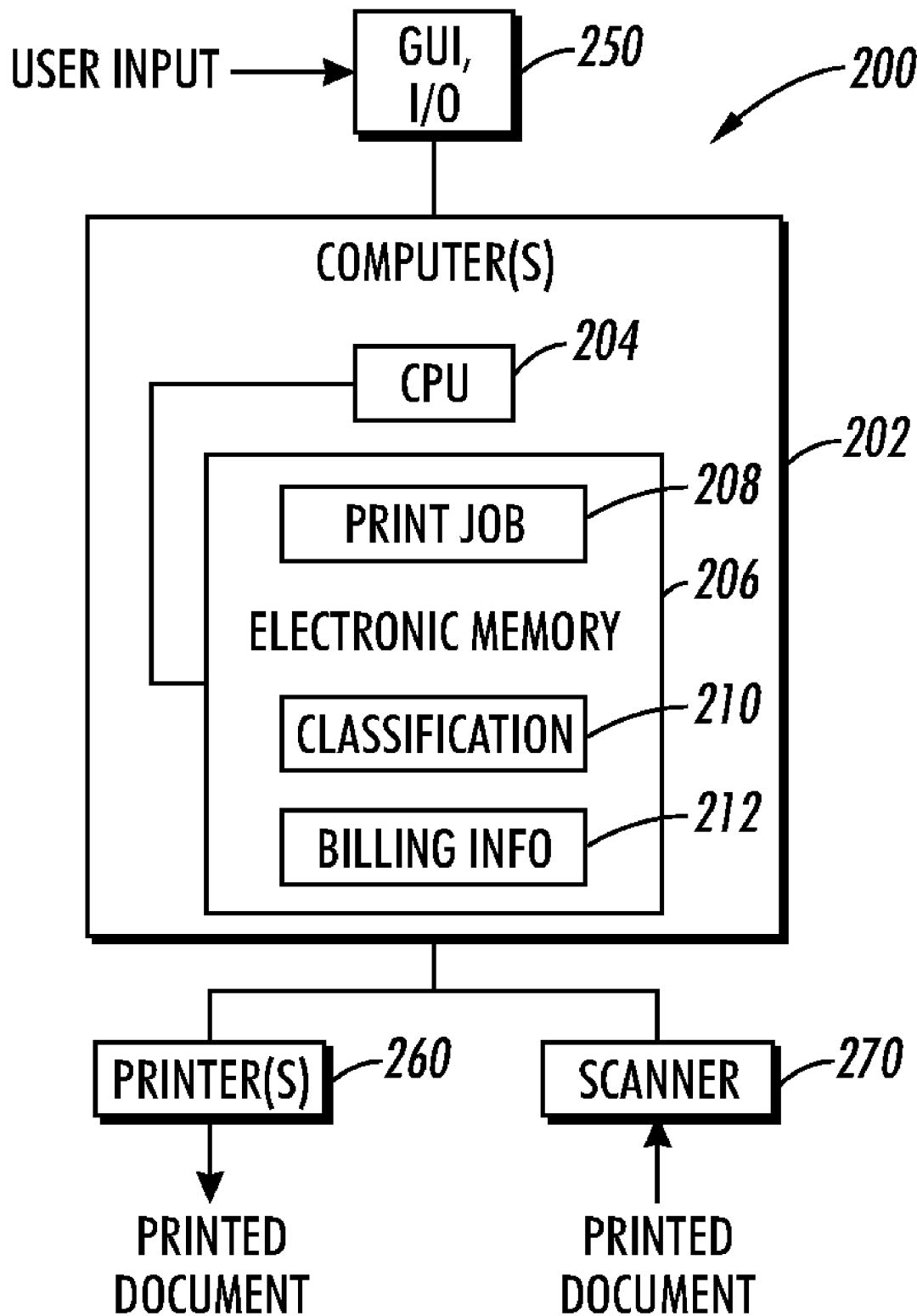
FIG. 2 is a schematic representation of a system according to embodiments herein.

Another embodiment, shown in FIG. 2, comprises a system 200 that includes a central processing unit 204 (within a computer 202) and graphic user interface 250 adapted to receive the instructions that relate to the print job 208. The system 200 can also include a scanner 270 operatively connected to the graphic user interface 250 through the computer 202 and central processing unit 204 to receive items to be printed/copied. The scanner 270 is adapted to scan a previously printed monochromatic document to produce rasterized data. A memory 206 is provided in the system 200 operatively connected to the scanner 270 to store the print job 208, the single/multi-color classification 210, the billing information 212, and any other necessary data.

Computers that include input/output devices, memories, processors, etc. are readily available devices produced by manufactures such as International Business Machines Corporation, Armonk N.Y., USA and Apple Computer Co., Cupertino Calif., USA. Such computers commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment is available from Xerox Corporation, Stamford, Conn., USA and Visioneer, Inc. Pleasanton, Calif., USA and the details of such devices are not discussed herein for purposes of brevity and reader focus.

The central processing unit 204 is operatively connected to the memory 206 and is adapted to execute a printing program (such as a print driver) to print the document. A printer 260 is included operatively connected to the central processing unit 204 and computer 202 and is adapted to print the document. The embodiments herein can be used with any conventional device that has the ability to print in multiple colors. One exemplary hardware system that efficiently prints in more than one color is disclosed in U.S. Patent Publication 2005/0185222 (the complete disclosure of which is incorporated herein by reference). The system disclosed in U.S. Patent Publication 2005/0185222 provides a solution for customers needing to add color to their documents when it makes economical sense to print the majority of black and white pages on a monochrome printer at a fraction of the cost of a color printer. In such a system, customers add tracking data (such as account number, page in set, etc.) to each sheet in job. The data is printed as an optical character recognition (OCR) line or other symbology for use in a document integrity subsystem. The color portion is printed on a color printer. The printed color portion is loaded into an interposer. The operator requests final printing using a graphic user interface where the monochrome portion of the job is merged with the color portion.

The word "printer" as used herein encompasses any apparatus, such as a digital copier, bookmaking machine, facsimile machine, multi-function machine, etc. which performs a print outputting function for any purpose. The details of printers, printing engines, etc. are well-known by those ordinarily skilled in the art and are discussed in, for example, U.S. Pat. No. 6,032,004, the complete disclosure of which is fully incorporated herein by reference. Printers are readily available devices produced by manufactures such as Xerox Corporation, Stamford, Conn., USA and Hewlett Packard Company, Palo Alto Calif., USA. Such printers commonly include input/outputs, power supplies, processors, media movement devices, marking devices etc., the details of which are omitted herefrom to allow the reader to focus on the salient aspects of the embodiments described herein.

As used herein, the printed document comprises a tangible object that includes markings (text) on physical sheets (printing media) that are capable of being read and/or recognized by humans. The printed publication is contrasted with an electronic document that is stored on some form of electronic media (as charges, etc.) that can be read only by a machine and that must be converted into human readable text by the machine and displayed to the user by the machine on some form of electronic display device. The printed publication can comprise any type of physical hard copy item including a book, pamphlet, newspaper, magazine, etc.

Thus, the embodiments herein provide a method of selecting the printer color mode based upon the colorspace of the PDL content. With embodiments herein, the printer evaluates the content of each page to be printed. Pages which exclusively contain objects defined in single color colorspaces will be printed and billed in a single color print mode. The default value for single color print mode is black, but users may specify single colors other than black. Jobs printed in the single color mode using black toner are counted as a black only print. The determination of black only pages by evaluating color spaces and color values utilized on the page by embodiments herein is faster and uses less computing resources than a post-raster image processing evaluation of the pixels generated for the page.

All foregoing embodiments are specifically applicable to electrostatographic and/or xerographic machines and/or processes as well as to software programs stored on the electronic memory 206 and to services whereby the foregoing methods are provided to others for a service fee. It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. The claims can encompass embodiments in hardware, software, and/or a combination thereof.

What is claimed is:

1. A computer-implemented method comprising:
    receiving a multi-page single document print job on a multiple-color printing apparatus for a customer from an intermediate program that provides a color classification of said multi-page single document print job, wherein said multi-page single document print job comprises instructions to print a single document comprising at least two pages for said customer;
    evaluating, by a computing device, each page of said multi-page single document print job to determine whether any multi-color items are included within each page of said multi-page single document print job;
    classifying, by said computing device, independent of said color classification from said intermediate program, each page of said multi-page single document print job as one of a multi-color page and a single color page based only on whether said multi-color items are included within each page;
    providing billing information for said customer, by said computing device, based on said classifying independent of said color classification from said intermediate program, wherein said billing information makes a distinction between said multi-color page and said single color page within said multi-page single document print job; and
    printing said document on said multiple-color printing apparatus.

2. The method according to claim 1, wherein said distinction between said multi-color page and said single color page charges different amounts between said multi-color page and said single color page.

3. The method according to claim 1, wherein said classifying of said multi-page single document print job comprises classifying grayscale printing as a single color page.

4. The method according to claim 1, wherein said multi-page single document print job comprises data and print characteristics.

5. A computer-implemented method comprising:
    receiving a multi-page single document print job on a multiple-color printing apparatus for a customer from an intermediate program that provides a color classification of said multi-page single document print job, wherein said multi-page single document print job comprises instructions to print a single document comprising at least two pages for said customer;
    evaluating, by a computing device, each page of said multi-page single document print job to determine whether any color items are included within each page of said multi-page single document print job;
    classifying, by said computing device, independent of said color classification from said intermediate program, said multi-page single document print job as one of a color print job and a black and white print job based only on whether said color items are included within each page of said multi-page single document print job;
    providing billing information for said customer, by said computing device, based on said classifying independent of said color classification from said intermediate program, wherein said billing information makes a distinction between said color print job and said black and white print job for each page within said multi-page print job; and
    printing said document on said multiple-color printing apparatus.

6. The method according to claim 5, wherein said distinction between said color print job and said black and white print job charges more for color pages and less for black and white pages.

7. The method according to claim 5, wherein said classifying of said multi-page single document print job comprises classifying grayscale printing as a black and white job.

8. The method according to claim 5, wherein said multi-page single document print job comprises data and print characteristics.

9. A computer-implemented method comprising:
    receiving a multi-page single document print job on a multiple-color printing apparatus for a customer from a print driver, wherein said multi-page single document print job comprises instructions to print a single document comprising at least two pages for said customer;
    evaluating, by a computing device, each page of said multi-page single document print job to determine whether any multi-color items are included within each page of said multi-page single document print job;
    ignoring classifications, by said computing device, of said multi-page print job as one of a multi-color print job and a single color print job from said print driver;
    classifying, by said computing device, said multi-page single document print job as one of said multi-color print job and said single color print job based only on whether said multi-color items are included within said multi-page single document print job;
    providing billing information for said customer, by said computing device, based on said classifying, and not on said classifications of said multi-page single document print job from said print driver, wherein said billing information makes a distinction between said multi-color print job and said single color print job for each page within said multi-page single document print job; and printing said document on said multiple-color printing apparatus.

10. The method according to claim 9, wherein said distinction between said multi-color print job and said single color print job charges different amounts between said multi-color pages and single color pages.

11. The method according to claim 9, wherein said classifying of said multi-page single document print job comprises classifying grayscale printing as a single color job.

12. The method according to claim 9, wherein said multi-page single document print job comprises data and print characteristics.

13. A computer-implemented method comprising:
receiving a multi-page single document print job on a multiple-color printing apparatus for a customer from an intermediate program that provides a color classification of said multi-page single document print job, said intermediate program classifying at least one page of said multi-page single document print job as a grayscale page, wherein said multi-page single document print job comprises instructions to print a single document comprising at least two pages for said customer;
evaluating, by a computing device, each page of said multi-page single document print job to determine whether any multi-color items are included within each page of said multi-page single document print job;
classifying, by said computing device, independent of said color classification from said intermediate program, each page of said multi-page single document print job as one of a multi-color page and a single color page based only on whether said multi-color items are included within each page;
providing billing information for said customer, by said computing device, based on said classifying independent of said color classification from said intermediate program, such that said grayscale page is classified as a single color document, wherein said billing information makes a distinction between said multi-color page and said single color page within said multi-page single document print job; and printing said document on said multiple-color printing apparatus.

14. The method according to claim 13, wherein said distinction between said multi-color page and said single color page charges different amounts between said multi-color page and said single color page.

15. The method according to claim 13, wherein said classifying of said multi-page single document print job comprises classifying grayscale printing as a single color page.

16. The method according to claim 13, wherein said multi-page single document print job comprises data and print characteristics.

17. A computer program product comprising:
a computer-readable storage medium storing instructions that, when executed by a computer, cause the computer to perform a method comprising:
receiving a multi-page single document print job for a customer from an intermediate program that provides a color classification of said multi-page single document print job, wherein said multi-page single document print job comprises instructions to print a single document comprising at least two pages for said customer;
evaluating each page of said multi-page single document print job to determine whether any multi-color items are included within each page of said multi-page single document print job;
classifying, independent of said color classification from said intermediate program, each page of said multi-page single document print job as one of a multi-color page and a single color page based only on whether said multi-color items are included within each page;
providing billing information for said customer based on said classifying independent of said color classification from said intermediate program, wherein said billing information makes a distinction between said multi-color page and said single color page within said multi-page single document print job; and
printing said document.

* * * * *